United States Patent Office 3,207,191
Patented Sept. 21, 1965

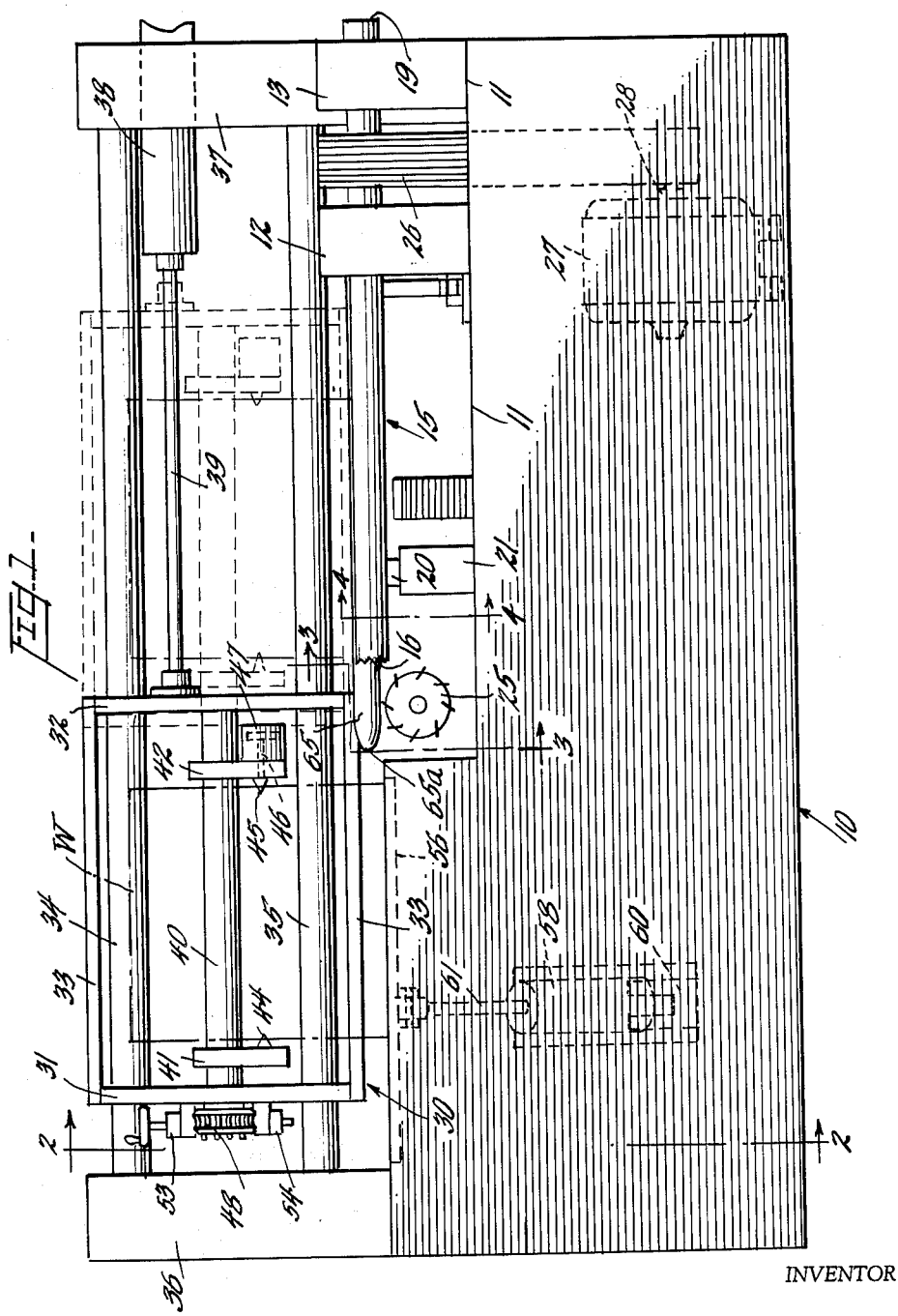

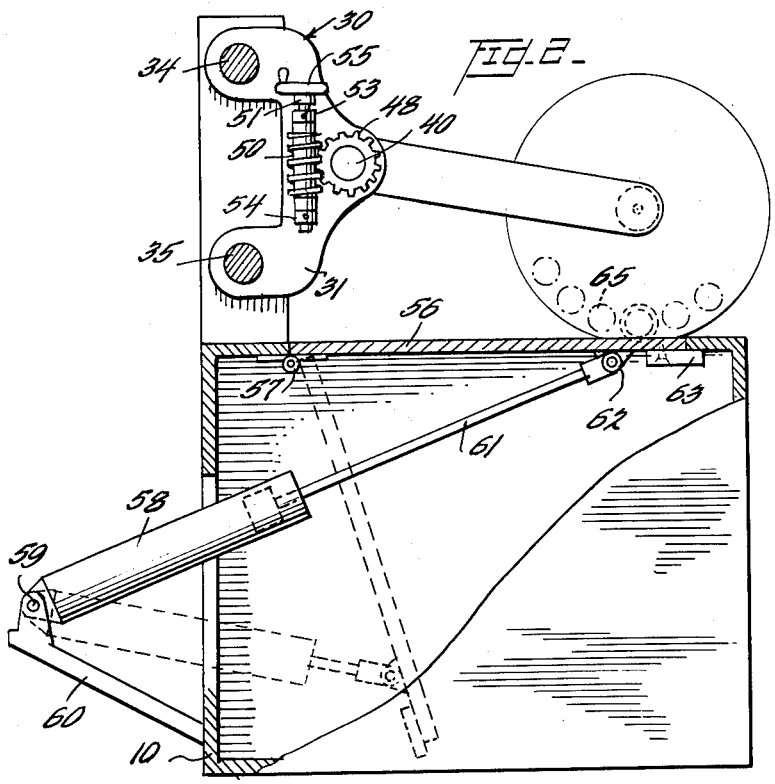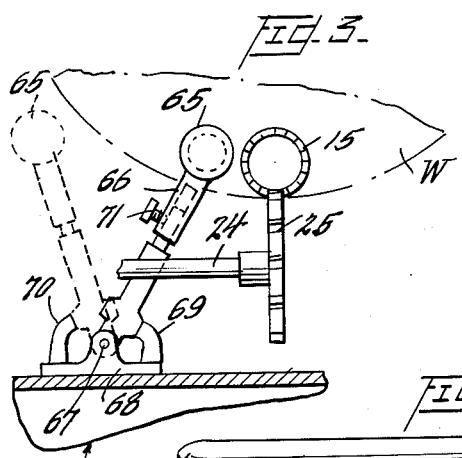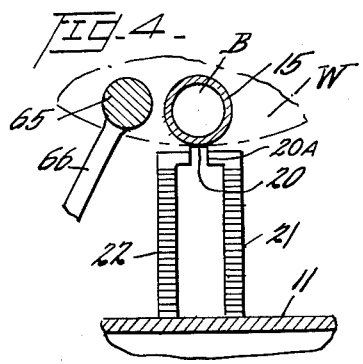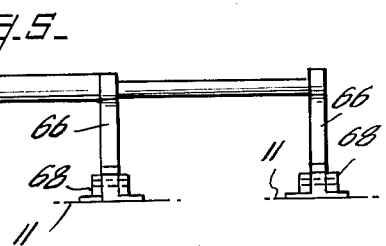

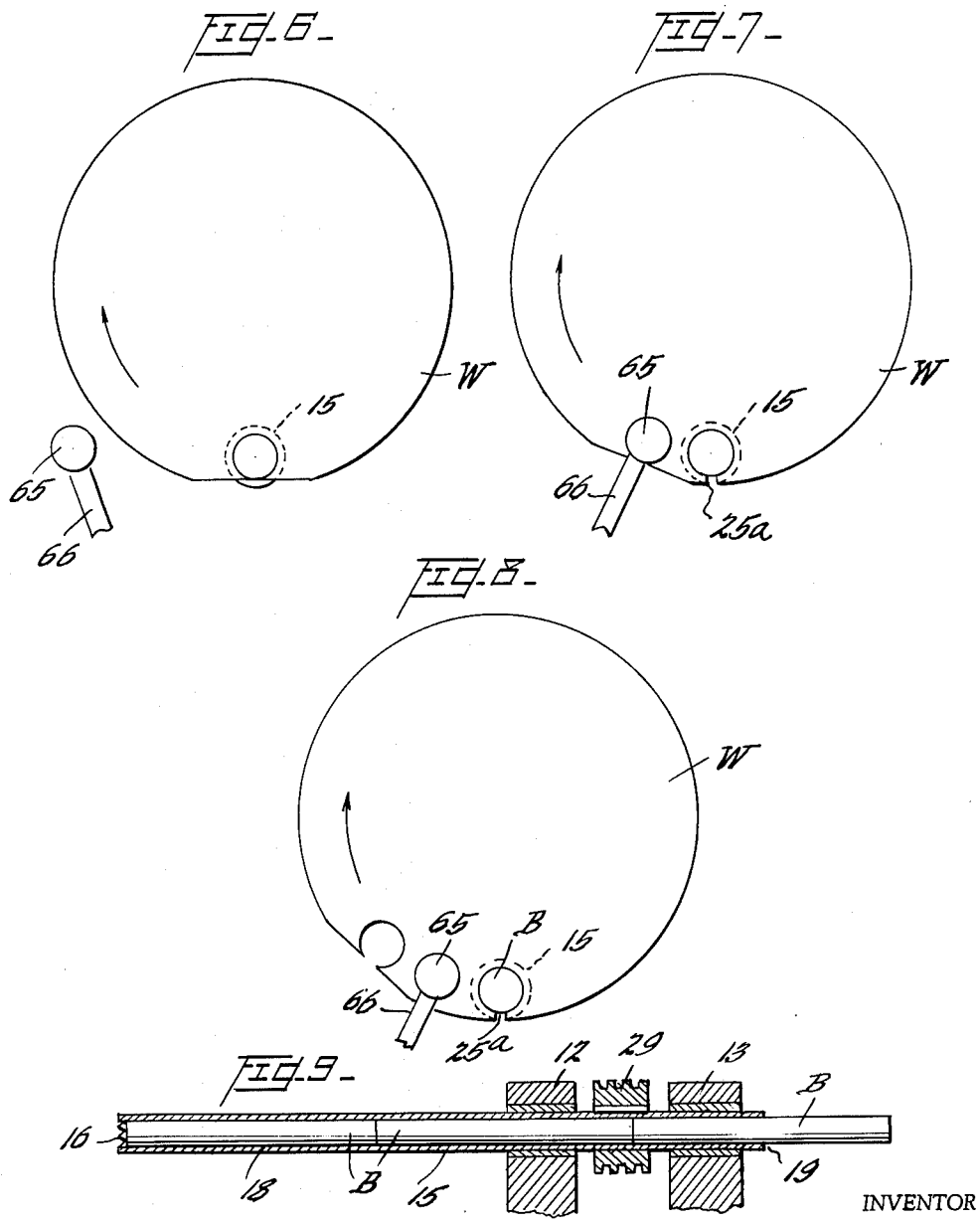

3,207,191
TUBULAR SAW FOR CUTTING, SHAPING AND
FEEDING CYLINDRICAL BILLETS
Evander M. Ervin, Florence County, S.C., assignor, by
direct and mesne assignments, to The Terrell Machine
Company, Charlotte, N.C., a corporation of North
Carolina
Filed Nov. 16, 1961, Ser. No. 152,896
15 Claims. (Cl. 143—85)

This invention relates to a tubular saw of the type adapted for forming cylindrical billets from a rough log or workpiece.

In prior saws of this general type the free or cutting end of the saw has heretofore been unsupported, this lack of support having been required in order to avoid interference with the workpiece by the supporting bearing which otherwise might have been disposed at or adjacent to the cutting end of the saw. This lack of support at the cutting end has rendered the saw susceptible to both lateral and vertical deflection as caused, for instance, by a divergency in the direction of the saw axis and the grain of the workpiece.

Furthermore in such prior art saws, the tubular saw has been obstructed or closed at the end opposite its cutting end and it has become necessary to provide some means for ejecting the billets from the tubular saw through its cutting end at the conclusion of each cutting operation. Obviously this mode of ejection has required provision of special mechanism for its accomplishment and in addition the time required for ejection has detracted from the time available for the next ensuing cutting operation.

With these considerations in mind, it is the primary object of the present invention to provide a means for supporting the free or cutting end of a tubular saw in such manner as to avoid interference with the relative feeding movement between the workpiece and the saw. To this end the present invention contemplates providing simply a segmental bearing or support at or near the free end of the saw which engages only a portion, in any event less than half of the circumference, of the tubular saw and is free from engagement with the balance of the saw circumference or periphery.

The invention also contemplates the use of magnetic means for maintaining the saw properly seated in such segmental bearing or support. Moreover, in conjunction with the aforesaid segmental bearing, the invention contemplates the use of a slotting saw or other suitable slotting means disposed in advance of the cutting end of the tubular saw and in alignment with the segmental bearing to provide an opening in the workpiece to pass around and free of the segmental bearing, and also a ready means for the escape of the sawdust resulting from the cutting operation.

A further important object of the invention is to provide such an arrangement and disposition of the tubular saw that the billets or cylindrical pieces cut thereby and received therein will be fed axially through the saw and discharged rearwardly through its rearwardly opening end simply by pressure of successively cut billets, without the necessity for any mechanical means for ejecting the cut pieces in the manner heretofore required.

A still further object is to provide a novel means for supporting, feeding and indexing a rough workpiece or log in a manner to feed same relatively to the tubular saw a plurality of times and to permit accurate angular indexing of the said workpiece between each feeding movement in order to secure a maximum number of billets from a given workpiece.

A still further object is to provide in conjunction with the saw and the workpiece feeding and indexing means above mentioned, a novel arrangement of indexing guide or mandrel adapted for snug guiding reception in the bore formed through the workpiece by a preceding cut of the saw, whereby to accurately guide and maintain the workpiece and tubular saw in relative alignment during the next ensuing feeding and cutting operation.

The foregoing objects and advantages are all attained by the preferred embodiment of the invention illustrated simply by way of exemplification in the accompanying drawings, in which:

FIGURE 1 is a front elevation of a sawing machine embodying the improvements of the invention.

FIGURE 2 is a vertical cross-sectional view through FIGURE 1 taken on the line 2—2.

FIGURE 3 is an enlarged fragmentary vertical section on the line 3—3 of the FIGURE 1, showing the operative relationships between the tubular saw, the slotting saw and the guiding or indexing mandrel.

FIGURE 4 is an enlarged sectional view on the line 4—4 of FIGURE 1.

FIGURE 5 is a detailed side elevation of the indexing mandrel and its supporting means.

FIGURES 6, 7 and 8 respectively are diagrammatic views of a workpiece in the successive stages of operation in making successive cuts therein.

FIGURE 9 is a vertical cross-section in an axial plane through the tubular saw and the supporting bearings for its rear ends, the said bearings being shown fragmentarily.

Referring now in detail to the accompanying drawings the sawing machine of the invention comprises any suitable type of rigid supporting frame generally designated 10. The frame provides a substantially horizontal table or bed 11 on which are disposed relatively spaced bearings 12 and 13 exemplifying a suitable means for rotatably supporting the tubular saw 15 for rotation about its axis with the free or cutting end of the saw projecting a substantial distance in advance of the foremost bearing and being provided at its axially projected cutting end with conventional cutting teeth 16. It will be seen that the saw is in the form of a hollow cylindrical tube, the internal bore 18 of which extends completely therethrough so that the billets cut by it may pass completely through the interior of the saw from the front cutting end to be discharged through the open rear end 19 by the pressure of new billets being cut. In the present embodiment, the tubular saw 15 is shown as being supported for rotation about a horizontal axis as is believed to be the most convenient position for its operation, though this particular position is by no means essential to its operation as will be readily understood.

Since the free cutting end 16 of the tubular saw projects substantially in advance of its fixed supporting bearings 12 and 13, it will be apparent that if its free end were unsupported in any way as in the prior art, it could be readily deflected by variations in the direction in the grain in the wooden workpiece, as well as by other deflecting influences. Accordingly in order to provide proper support for the cutting end of this saw, it is an important feature of the invention to utilize a segmental bearing 20 which, in the present instance, is carried by and may comprise the free end of an arm 20A (FIGURE 4) extending substantially radially to the saw supported by a base 21 fixed on the horizontal table or surface 11 below the free end portion 16 of the saw. This segmental bearing, as will be seen by reference to FIGURES 1 and 4, engages only one side, namely the lower side in the present instance of the tubular saw at its external periphery. While the bearing thus provided may extend around the periphery of the saw for a greater or lesser circumferential extent than shown, it will never extend angularly in excess of half of the circumference of the tubular saw and generally will extend for less than that. The amount of angular engagement of the segmental bearing with the saw will depend to a large extent on the size and type of work being handled and, therefore, the deflecting influences to which the free end of the saw may be subjected in operation.

In order to permit maintaining of this angular extent of bearing engagement of segmental bearing 20 at a minimum, it is desirable to provide magnetic means for drawing the free end of the tubular saw 15 toward and into bearing engagement with the segmental bearing whereby even though the segmental bearing has but a small arcuate extent, it will, nevertheless, strongly resist lateral deflecting forces on the saw, as well as forces tending to vertically deflect it. Such magnetic means may be incorporated either in the segmental bearing 20 and/or its base or, if desired, may take the form of a separate magnet 22 such as shown in FIGURES 1 and 4, the magnet 22 in such case preferably being a strong electro-magnet of conventional type having its poles at its upper end below the tubular saw 15. It will, of course, be understood that the tubular saw 15 will be of ferrous material of a type which will be strongly attracted by the aforesaid magnet means 22.

It will be seen that as the relative feeding movement between the workpiece W and the saw 15 takes place the workpiece W and the segmental bearing 20 will be moved toward and past each other and it is, therefore, necessary to provide some means for avoiding interference between this bearing and the workpiece to permit movement of the workpiece past the bearing and its supporting arm 20A. To this end, there is provided a slotting saw 25 on the frame 10 in advance of the tubular saw 15 and aligned in an axial direction with the segmental bearing 20 and arm 20A in the direction of the axis of the tubular saw. The arrangement is such that the slotting saw 25 engages the work W as it is advanced to the tubular saw 15 during the feeding movement, and cuts a generally radial slot in the roughly cylindrical workpiece from one side thereof, namely the bottom in the present embodiment. This slot (25a in FIGURES 7, 8) is disposed to register with and pass around the arm 20A and segmental bearing 20 during the cutting operation.

In the present instance, it will be seen that the slotting saw is supported on a horizontal shaft 24 (FIGURE 3) generally below and at right angles to the rotational axis of the tubular saw. Shaft 24 may be driven by any suitable means (not shown). This slotting saw 25 is disposed in a radial plane with respect to the tubular saw 15 and is provided with peripheral cutting teeth, the tips of which extend into alignment in an axial direction with the lower wall of the tubular saw and terminate between the inner and outer peripheries (or within the projected wall thickness) of the tubular saw. With this arrangement, it will be seen that the slotting saw will not cut into or mutilate that portion of the workpiece which is received within the tubular saw to form the billet. At the same time, the slotting saw will cut away all that portion of the workpiece up to the tubular saw. By virtue of the fact that the slotting saw will have an axial dimension or, in other words, will be of an angular extent relative to the tubular saw which at least equals and preferably slightly exceeds the angular extent of the segmental bearing 20, the slot 25a formed in the workpiece by the slotting saw will readily clear the segmental bearing.

In the instant embodiment the tubular saw 15 itself will be fixedly axially positioned and will be rotated through a belt or flexible drive 26 from a suitable motor or prime mover 27 mounted within the lower portion of the frame as shown. Preferably the flexible drive 26 is of the multi-V belt type extending from a suitable sheave on the shaft 28 of motor 27 to a similar sheave 29 (FIGURE 9) keyed on the exterior of the tubular saw itself.

While the foregoing elements constitute the primary elements of the invention and may be utilized in conjunction with any suitable work supporting and feeding means, the invention includes a specific form of such means including indexing means of particular utility and simplified form.

The work supporting and feeding means illustrated comprises a suitable carriage, generally designated 30 having relatively opposed end plates 31 and 32 fixedly interconnected by plate 33 (FIGURE 1), the end plates being disposed and slidably supported for feeding movement along the upper and lower guide rods 34, 35 which extend between and are supported by the relatively spaced standards 36, 37 on the machine frame. The guide rods or rails 34, 35 and, therefore, the feeding movement of the carriage 30 extend in a direction parallel to the rotational axis of the tubular saw 15 and to one side thereof. For causing the feeding movement of the carriage 30, there may be provided conventional means such as a hydraulic ram having its cylinder 38 fixed to one of the supporting standards 37 and with its reciprocating piston rod 39 fixedly connected to the carriage. The ram may be either hydraulically or pneumatically actuated and will be of the usual double acting type. Since such rams are well known, as are the various fluid supplying and control means therefore, it is not deemed necessary to describe these latter means in any detail.

For supporting the workpiece W on the carriage 30, the carriage is provided with a supporting shaft 40, rotatably journaled between its two end plates and having thereon a pair of radial projecting work support arms 41, 42 at the free end of which are provided suitable work supporting and centering elements 44, 45. In the present embodiment, the work supporting and centering elements are shown in the form conventional conical centers, one of which 44 is fixed on its arm 41 and the other of which is carried at the end of a movable piston rod 46 for projection toward and away from the other said center thus to clamp the workpiece between the centers. The cylinder 47 for the said piston rod 46, as will be seen in FIGURE 1, is carried by the work supporting arm 42 and it will be understood that this cylinder and the ram construction of which it forms part are of conventional double acting type wherein the actuating fluid may be supplied to and withdrawn from the cylinder through suitable flexible hose connection, not shown.

When the workpiece is supported between the centers 44, 45 as shown in FIGURE 1, it will be necessary prior to feeding it to the saw to support it at the proper level for engagement with the saw. To this end, the supporting arms will be fixed on the rotary shaft 40 of the carriage for movement therewith, and rotary adjustment of the shaft and arms may be manually produced to bring the workpiece to the desired level, through the intermediary of a worm gearing such as shown in FIGURE 2 including the worm wheel 48 fixed on one end of the shaft 40, and the worm gear 50 fixedly supported on a shaft 51 extended through bearings 53, 54 on the end plate. Rotation of the worm gear 50 may be produced by means of a handwheel 55 keyed on the upper end of its shaft as shown.

It is desirable to provide a removable supporting surface such as the swingable table top 56 adapted for operative positioning at a predetermined level, with its upper surface parallel to and in advance of the tubular saw 15, as is best shown in FIGURES 1 and 2. The purpose of the table top is to facilitate initially positioning the workpiece in proper alignment with the tubular saw. It will be seen thus that the upper surface of the table top 56 when operatively positioned as shown in full lines in FIGURE 2, is disposed substantially tangentially to the inner periphery of the tubular saw or it may be disposed slightly below, but in no event above the said inner periphery. The table top 56 preferably is hingedly supported at 57 on the frame 10 at one edge for swinging movement about a horizontal axis from its operative position (shown in full lines in FIGURE 2) to a downwardly swung retracted position as shown in broken lines in said figure. A suitable means for moving the said table top between its operative and inoperative positions and for supporting it in its operative position is illustrated diagrammatically in FIGURE 2 as comprising a usual fluid actuated ram 58 having its cylinder pivotally connected at 59 to a supporting bracket 60 fixed on the frame 10 and the free end of its piston rod 61 pivotally connected to the table top at 62 adjacent to its free edge. A stop 63 fixed along the free edge engages the frame to determine the operative position of the table top.

Thus, in order to properly position a workpiece to be acted upon by the machine, the said workpiece W in the form of a rough but generally cylindrical log (preferably having one side flattened as by having a slab cut therefrom by a conventional saw) is simply placed upon the table top 56 in the operative position of the latter with the flat side resting against the table top. Thereupon the carriage 30, which will at this time be in retracted position or to the left, as seen in FIGURE 1, may have its supporting arms 41, 42 lowered onto either side of the workpiece to bring the work supporting centers 44, 45 to approximately the level of the center of the workpiece, whereupon the workpiece may be shifted if necessary into axial alignment with the centers. The movable center may then be projected to co-act with the stationary center to provide a rotatable support and indexing axis for the workpiece. Following this, the table top 56 may be lowered to permit the subsequent feeding, cutting and indexing operations. It will be seen then that through the intermediary of the ram 38, 39, the workpiece will be moved into operative engagement with the saw 15, being first engaged by the slotting saw 25 which will form a radial slot 25a therein from the bottom side to provide clearance for the bearing 20. After passing over the slotting saw, the workpiece W is acted upon by the tubular saw 15 which cuts a cylindrical bore through it and at the same time forms a cylindrical billet B (FIGURE 9) which is received interiorly of the tubular saw. At the conclusion of the cut, the carriage 30 is retracted and the workpiece partially rotated or indexed about axis defined by the supporting centers 44, 45 preparatory to taking the next cut.

It is desirable to take successive cuts as close together as is practical in order to insure the maximum number of cuts from a given workpiece. In order to assist in properly indexing the workpiece for such closely adjacent cuts, as well as to provide a firm and positive alignment guide for its successive feeding movements, there is provided a guiding and indexing mandrel 65 which, when in operative position, is supported on the frame 10 at a level just above the operative level of the table and to one side of the rotary tubular saw 15. Since such a mandrel would interfere with the movement of the workpiece during the initial cut of the tubular saw on a given workpiece, it is retractably supported, as by means of the hinged arms 66 shown in FIGURE 3. Thus, when in its operative position, it will extend with its axis parallel to that of the tubular saw, but when retracted, as shown in broken lines in FIGURE 3, it will normally lie outside of the path of movement of the workpiece W. It will be understood that the external diameter of the mandrel 65 will normally be just slightly less than the exterior diameter of the tubular saw so that the mandrel will be slidably received in a bore which has been formed through a log on a preceding cut, to thus firmly guide the workpiece with respect to the tubular saw on an ensuing cut.

Preferably the forward or free end 65a of the mandrel projects in advance of both saws 15 and 25 and is rounded or bullet-nosed to provide a suitable pilot for reception in a bore within the log, and to exert a camming action tending to accurately angularly position or index the log with respect to the tubular saw.

As will be seen in FIGURES 3 and 5, the movable supporting arms 66 for the mandrel are hingedly supported at 67 on a bracket 68 fixed on the stationary bed of the frame. These arms are swingable between an operative position determined by a stop 69 to one side of the hinge axis, and to an inoperative and retracted position as determined by a stop 70 on the other side of the hinge axis. In order to regulate the position of the mandrel for cooperation to best advantage with logs of widely varying diameters, the supporting arms may each be of adjustable length comprising relatively telescoping portions capable of being fixedly interlocked in their desired position of adjustment, as by the set screw 71 shown in FIGURE 3.

*Operation*

In the overall operation of the apparatus above described, in order to place a workpiece in such apparatus to commence its operation, the following steps are pursued:

The saw table 56 is raised to its operative position as per the full line showing in FIGURE 2, through operation of its fluid actuated ram. Also the work carriage 30 is retracted to a position overlying the work table as shown in FIGURE 1. In this position the work centers 44, 45 will be fully separated following removal of the preceding workpiece, and a new workpiece may be placed on the table top 56 and positioned laterally to lie between these centers and in rough axial alignment therewith. Such position of the workpiece may be facilitated by preliminarily sawing a slab from one side of the workpiece to thus provide the workpiece with a flattened side extending substantially parallel to its axis. Once the workpiece has thus been positioned, the supporting arms may be raised or lowered by actuation of the worm gear mechanism in order to raise or lower the centers 44, 45 to bring them approximately into alignment with the cylindrical axis of the workpiece, following which the ram for the movable center 45 may be appropriately actuated to project that center into operative engagement with the workpiece, whereby to rotatably support the workpiece between the two centers for rotation about an indexing axis substantially coinciding with its cylindrical axis and defined by said centers 44, 45. Since the workpiece will normally consist of a raw log of wood, it will be understood that the location of the foregoing axis can only be approximate. However, by forming the flat sides of all the logs at a uniform distance from the log axis, adjustment of the elevation of centers 44, 45 and of the position of mandrel 65, may be maintained constant for all of the logs of a given batch or group.

Once the workpiece is thus positioned between the centers, the work table 52 is lowered to inoperative position as indicated by the broken line in FIGURE 2, through appropriate actuation of its control ram. As thus retracted, the table 56 will not interfere with the ensuing indexing movement of the workpiece.

The workpiece is then fed toward the slotting and tubular saws through appropriate movement of its carriage 30 as controlled by the ram 38. As it moves past the slotting saw 25, it has formed therein a generally radial slot 25a in alignment with the segmental bearing 20 in the direction of its movement and of a width such that it will freely receive said bearing, and in addition will permit the escape of the sawdust created by operation of the tubular saw. The carriage 30 will be moved to the right at least to the position shown in broken lines on the right hand side of FIGURE 1, in which position the toothed forward end 16 of the tubular saw will have passed completely through the workpiece from one end to the other, cutting free a cylindrical billet B (FIGURE 9) which will be received within the hollow interior of the tubular saw. During this first cut on the workpiece, the mandrel 65 will have been retracted to the position shown in FIGURE 6 and in broken lines in FIGURE 3, to avoid obstructing the feeding of the workpiece. However, following completion of this first cut, the carriage 30 is retracted to withdraw the workpiece from the saws and restore it to its left hand position as shown in full lines in FIGURE 1. Following this, the mandrel 65 is operatively positioned as shown in full lines in FIGURES 3 and 7, and the workpiece is manually rotated on its supporting centers and about the indexing axis defined thereby to bring the bore just formed into substantial endwise registry or axial alignment with the operatively positioned mandrel as shown in FIGURE 7. Again the ram 38 is actuated to institute a second feeding movement of the carriage 30. At the inception of this movement, the rounded nose or pilot portion 65a of the mandrel is received within the substantially registering bore just completed within the workpiece and, through an obvious camming action will accurately align the bore with the mandrel so that accurate indexing is achieved by the time the workpiece is engaged by the saws 15 and 25. Thus, during the completion of the feeding cycle, the mandrel 65 by coaction with the bore in which it is received will accurately guide and maintain the indexed position of the workpiece with respect to the tubular saw and its associated slotting saw. At the end of the feeding cycle of the carriage 30, it will then again be returned to its starting position and again indexed to a new position as indicated in FIGURE 8, to bring its last completed bore into registry with the mandrel. Thus the workpiece is repeatedly indexed, fed to the saws, and then retracted and re-indexed until the maximum possible number of cuts have been taken.

It will be seen from FIGURE 9 that after the completion of each cut, the cylindrical billet B removed from the workpiece W will lie at the forward end of the hollow bore of the tubular saw 15 and will be urged one length toward the rear end thereof incident to the taking of each additional cut, until it is finally ejected through the open rear end of the tubular saw. Since this ejection of the workpiece occurs incident to the cutting action, this eliminates the need for special ejection mechanism as well as for the time and manipulation by the operator that would be required in the operation of such ejection mechanism.

It will be apparent that the sawing machine herein described may operate without the indexing mandrel as above described despite the obvious advantages of the latter. It will be further apparent that in place of the means herein specifically disclosed for supporting and feeding the workpiece, namely the carriage and its associated parts, there may be substituted any suitable means for supporting the workpiece for rotary movement about a fixed indexing axis parallel to that of the tubular saw and for traversing movement along such fixed axis.

In this application I have shown and described only the preferred embodiment of my invention, simply by way of illustrating the preferred mode of carrying out the invention. However, it will be recognized that the invention is capable of other and different embodiments, and that its several details are capable of modification in various respects, all without departing from the invention as defined in the accompanying claims.

Having thus described my invention, I claim as new and desire to secure by Letters Patent:

1. A woodworking machine comprising a supporting frame, a hollow tubular cylindrical saw having axially presented front and rear ends with axially presented cutting teeth at its front end, said saw defining an axial bore opening through both ends thereof, bearing means supporting the rear end portion of the saw on said frame for rotation about a fixed horizontal axis coincident with the cylindrical axis of the saw, a segmental bearing supported on said frame in operative engagement with the external periphery of the saw adjacent its cutting end, said segmental bearing being disengaged from the saw for the majority of the total circumference of the saw, a slotting saw on said frame in advance of said tubular saw and aligned in an axial direction with said segmental bearing means in the direction of said fixed axis, said slotting saw being disposed to cut a radial slot in a workpiece for reception of said segmental bearing means incident to axial feeding movement of the workpiece onto said tubular saw.

2. A woodworking machine as defined in claim 1 including work supporting and feeding means movable on said frame for supporting a workpiece for rotary adjustment about an indexing axis spaced from and parallel to said fixed axis of the tubular saw and for traversing movement along said indexing axis.

3. A woodworking machine as defined in claim 1 including magnetic means on the same radial side of said tubular saw as said segmental bearing for maintaining said tubular saw in engagement with said bearing, said tubular saw being of magnetic material.

4. A woodworking machine as defined in claim 1 including a carriage for supporting a workpiece for traversing movement parallel to said fixed axis, and for rotary indexing adjustment about an indexing axis spaced from and parallel to said fixed axis, and a work positioning table having a plane upper surface normally operatively positioned in advance of both said saws and approximately tangentially to said tubular saw, said table being selectively movable between its said operative position and a retracted position wherein the said surface is relatively remote from said fixed axis.

5. A woodworking machine as defined in claim 4, including a generally cylindrical indexing and guiding mandrel normally supported on said frame above said table in the operative position of the table, said mandrel having an external diameter substantially equal to that of the tubular saw, the major axis of said mandrel extending parallel to said fixed axis of the tubular saw and being angularly displaced around said indexing axis from the said fixed axis, and equidistant with said fixed axis from said indexing axis, and means supporting said mandrel for movement between its said operative position and an inoperative position out of the path of movement of said workpiece.

6. A woodworking machine comprising a supporting frame, a hollow tubular cylindrical saw having axially presented front and rear ends with an annular series of axially presented cutting teeth at its front end disposed to cut a cylindrical billet from and leave a cylindrical bore in a workpiece, bearing means supporting said saw for rotation about a fixed axis coincident with its cylindrical axis, an indexing and guiding mandrel supported on said frame in a normal operative position with its major axis parallel to said fixed axis of the saw, a work carriage movable on said frame and supporting a workpiece for traversing movement parallel to said fixed axis and for rotary adjustment about an indexing axis spaced from and parallel to said fixed axis, said mandrel axis being angularly displaced around said indexing axis from the fixed axis and equidistant with said fixed axis from the indexing axis, and means supporting said mandrel for movement between its said operative position and an inoperative position disengaged from said workpiece.

7. A woodworking machine as defined in claim 6 including a slotting saw on said frame in advance of said tubular saw arranged to form in the workpiece a radial slot intersecting said bore in an axial plane thereof and opening through one side of said workpiece.

8. A woodworking machine comprising a supporting frame, a hollow tubular saw having an axially presenting annular cutting end, bearing means supporting the other end of the saw on said frame for rotation about a fixed horizontal axis, a segmental bearing on said frame engaging the periphery of said saw adjacent its cutting end for a portion only of the circumference of the saw, and being completely disengaged from said saw for the major portion of the circumference of said saw, in combination with a slotting saw on said frame in advance of said tubular saw and aligned in an axial direction with said segmental bearing, said slotting saw being of a circumferential extent relative to the tubular saw at least equal to that of the segmental bearing, means whereby to form in the workpiece a slot for reception of said bearing, during feeding of the workpiece.

9. A woodworking machine comprising a supporting frame, a cylindrical saw defining an axial bore opening through and unobstructed at both ends thereof to permit the passage of cut-out portions of a workpiece completely therethrough, said saw having cutting means at one axial end, bearing means supporting the end of said saw remote from said cutting means for rotation about its cylindrical axis, a segmental bearing rotatably supporting said saw adjacent its said one axial end, said bearing being disengaged from said saw for at least half of the circumference of said saw, said saw being of magnetic material, and magnetic means adjacent said segmental bearing exerting means to feed a workpiece to form in the workpiece a slot for reception of said bearing.

10. A woodworking machine for cutting cylindrical billets comprising a supporting frame, a hollow tubular saw having a passage therethrough free from obstructions and open at both ends for shaping and feeding cut out cylindrical portions of a workpiece completely therethrough, said saw having annularly arranged cutting teeth at one end, and bearing means supporting said saw for rotation about its tubular axis, in combination with a slotting saw on said frame in advance of said cutting teeth, the periphery of said slotting saw intersecting the imaginary extension of the exterior surface of said tubular saw, but terminating short of intersection with the imaginary extension of the inner periphery of said saw.

11. A woodworking machine comprising a frame, a hollow tubular saw having an axially presented cutting end, bearing means supporting said saw on the frame for rotation about a fixed axis, said bearing means operatively engaging the outer periphery of the saw adjacent its said cutting end and comprising a supporting arm carried by said frame and extending substantially radially to said saw, in combination with a slotting saw on said frame in advance of the cutting end of the saw and aligned in an axial direction with said supporting arm, said slotting saw being of a circumferential extent relative to the tubular saw at least equal to that of said supporting arm, whereby to form in the workpiece a slot for reception of said arm during feeding of the workpiece.

12. Means of the character described for cutting cylindrical billets comprising a frame structure, an elongated and hollow tubular saw having a passage therethrough free from obstruction, said saw being carried by said frame structure for rotation about its tubular axis, means arranged on said frame structure for supporting a workpiece to have billets cut interiorly therefrom by said tubular saw, drive means to rotate said tubular saw for cutting action, means for causing relative feeding movement of said tubular saw and said supporting means in the direction of the tubular axis of the saw to apply said saw for cutting, shaping and feeding a cylindrical billet through said passage from a workpiece held by said supporting means, said supporting means being formed to hold said workpiece for indexing manipulation about an axis parallel to the tubular saw axis, and a slotting saw disposed on said frame structure for cutting said workpiece exteriorly in advance of said tubular saw and in alignment therewith, the disposition of said slotting saw being such as to position it for cutting in intersecting relation with respect to the imaginary extension of the exterior surface of said tubular saw but short of the imaginary extension of the inner periphery of said tubular saw.

13. Means of the character described as defined in claim 12 and further characterized in that the indexing manipulation of said workpiece that is provided for by said supporting means comprises selective rotating movement of the workpiece about the axis at which it is held and selective lateral spacing of said axis in relation to the tubular saw axis.

14. Means of the character described for cutting cylindrical billets of substantial length interiorly from a rough wooden workpiece such as a log section, said means comprising a hollow tubular saw having an elongated body portion mounted for rotation about its tubular axis and having a passage therethrough free from obstruction, drive means to rotate said tubular saw for cutting action, means for supporting said workpiece adjacently so that it is held for selective positioning in parallel relation with and selectively shiftable in lateral relation to the tubular axis of said saw, means for causing relative feeding and recovery movement of said tubular saw and said supporting means in the direction of said tubular saw axis to apply said saw for cutting and shaping a cylindrical billet interiorly from said workpiece and then withdrawing the saw and the cut billet therefrom for eventual feeding of said billet through said passage, and an auxiliary slotting saw operable for cutting said workpiece exteriorly in advance of said tubular saw to an aligned extent having a sufficient inward reach to be intersected by the following cut of said tubular saw while remaining clear of that portion of said workpiece from which a billet is formed during said following cut.

15. Means of the character described for cutting cylindrical billets of substantial length interiorly from a rough wooden workpiece such as a log section, said means comprising a hollow tubular saw having an elongated body portion mounted for rotation about its tubular axis, said tubular saw having an unobstructed passage therethrough for receiving cylindrical billets shaped by said saw and allowing said billets to be fed through said passage, drive means to rotate said tubular saw for cutting action, means for supporting said workpiece adjacently so that it is held for selective positioning in parallel relation with and selectively shiftable in lateral relation to the tubular axis of said saw, means for causing relative feeding and recovery movement of said tubular saw and said supporting means in the direction of said tubular saw axis to apply said saw for cutting a billet interiorly from said workpiece and then withdrawing the saw and the cut billet therefrom to leave a void therein, and auxiliary slotting saw means disposed for acting exteriorly on said workpiece in advance of said tubular saw to cut away a portion of said workpiece in intersecting relation with the void to be formed by the following cut of said tubular saw while remaining clear of that portion of said workpiece from which a billet is formed during said following cut.

References Cited by the Examiner

UNITED STATES PATENTS

| | | | |
|---|---|---|---|
| 22,792 | 2/59 | Field | 143—85 |
| 313,405 | 3/85 | Davis | 145—120 XR |
| 375,887 | 1/88 | McIntyre. | |
| 569,234 | 10/96 | Rockwell | 144—12 |
| 802,184 | 10/05 | Farnum | 144—12 |
| 1,168,923 | 1/16 | Weeks | 144—12 |
| 2,680,457 | 6/54 | Kakuk et al. | |
| 2,755,827 | 7/56 | Gerding. | |

FOREIGN PATENTS

| | | |
|---|---|---|
| 1,569 | 7/54 | Great Britain. |
| 5,169 | 2/97 | Great Britain. |

LESTER M. SWINGLE, *Primary Examiner.*

WALTER A. SCHEEL, WILLIAM W. DYER, Jr.,
*Examiners.*

UNITED STATES PATENT OFFICE
CERTIFICATE OF CORRECTION

Patent No. 3,207,191

September 21, 1965

Evander M. Ervin

It is hereby certified that error appears in the above numbered patent requiring correction and that the said Letters Patent should read as corrected below.

Column 9, lines 7, 8 and 9, strike out "means whereby to form in the workpiece a slot for reception of said bearing, during feeding of the workpiece" and insert instead -- means to feed a workpiece to form in the workpiece a slot for reception of said bearing --; lines 22 and 23, strike out "means to feed a workpiece to form in the workpiece a slot for reception of said bearing." and insert instead -- a magnetic attracting force on said saw in a direction toward said segmental bearing. --.

(SEAL)    Signed and sealed this 19th day of April 1966.

Attest:

ERNEST W. SWIDER
Attesting Officer

EDWARD J. BRENNER
Commissioner of Patents